(12) United States Patent
Hadorn et al.

(10) Patent No.: US 11,432,233 B2
(45) Date of Patent: Aug. 30, 2022

(54) GREEDY USER EQUIPMENT DATA TRANSPORT NETWORK SELECTION

(71) Applicant: Opanga Networks, Inc., Seattle, WA (US)

(72) Inventors: Ben Hadorn, Seattle, WA (US); Ben Hoobler, Seattle, WA (US); John Burnette, Seattle, WA (US); Dave Gibbons, Seattle, WA (US); Zack Brentson, Seattle, WA (US); Chris Graham, Seattle, WA (US); Michelle Miller, Seattle, WA (US)

(73) Assignee: Opanga Networks, Inc., Bellevue, WA (US)

( * ) Notice: Subject to any disclaimer, the term of this patent is extended or adjusted under 35 U.S.C. 154(b) by 115 days.

(21) Appl. No.: 16/600,100

(22) Filed: Oct. 11, 2019

(65) Prior Publication Data

US 2020/0120586 A1    Apr. 16, 2020

Related U.S. Application Data

(60) Provisional application No. 62/745,063, filed on Oct. 12, 2018.

(51) Int. Cl.
*H04W 4/00* (2018.01)
*H04W 48/00* (2009.01)
*H04W 36/14* (2009.01)

(52) U.S. Cl.
CPC ........... *H04W 48/17* (2013.01); *H04W 36/14* (2013.01)

(58) Field of Classification Search
CPC .............................. H04W 48/17; H04W 36/14
See application file for complete search history.

(56) References Cited

U.S. PATENT DOCUMENTS 9,215,651 B2   12/2015   Rong et al.
9,414,404 B1   8/2016   Travostino et al.
(Continued)

FOREIGN PATENT DOCUMENTS

EP   1786151 A2   5/2007
WO   WO2014209569 A1   12/2014

OTHER PUBLICATIONS

International Search Report and Written Opinion for PCT/US2019/055933 dated Apr. 22, 2021.
(Continued)

*Primary Examiner* — Justin Y Lee

(57) ABSTRACT

A wireless device determines whether a data session is performance sensitive, and in response to the data session being performance sensitive, selects a data transport node (DTN) and performs the data session using the selected DTN. Whether a data session is performance sensitive may be determined using information on a process associated with the data session, by monitoring the data session, or both. The DTN may be selected from a list of available DTNs according to which DTN will probably provide the highest performance for the data session, or according to which DTN or DTNs will probably provide adequate performance. Micro speed tests, historical performance information, or other criteria may be used to predict the performance of the available DTNs. When multiple DTNs satisfy the selection criteria, a "good neighbor" policy may be used to select the DTN.

21 Claims, 4 Drawing Sheets

(56) References Cited

U.S. PATENT DOCUMENTS

| | | | |
|---|---|---|---|
| 9,516,452 B2* | 12/2016 | Bandyopadhyay | ........................... H04L 63/0492 |
| 2009/0052322 A1* | 2/2009 | Simonsson | ........... H04W 28/20 370/235 |
| 2011/0287802 A1* | 11/2011 | Ma | ................... H04W 72/0453 455/517 |
| 2015/0103755 A1 | 4/2015 | Cui et al. | |
| 2016/0192238 A1 | 6/2016 | Papadopoulos | |
| 2016/0278007 A1 | 9/2016 | Gokhale | |
| 2017/0105222 A1* | 4/2017 | Nieman | ................ H04W 72/02 |
| 2019/0116532 A1* | 4/2019 | Morihiro | ............... H04W 36/38 |
| 2020/0118151 A1* | 4/2020 | Makke | ............... G06Q 30/0215 |

OTHER PUBLICATIONS

Extended European Search Report for related Application No. 19870461.1, dated Jun. 10, 2022.

* cited by examiner

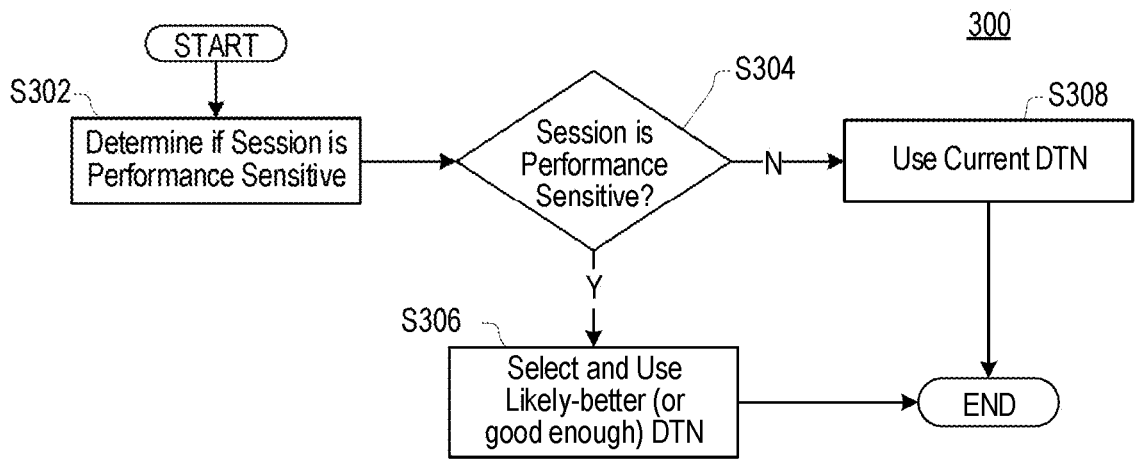
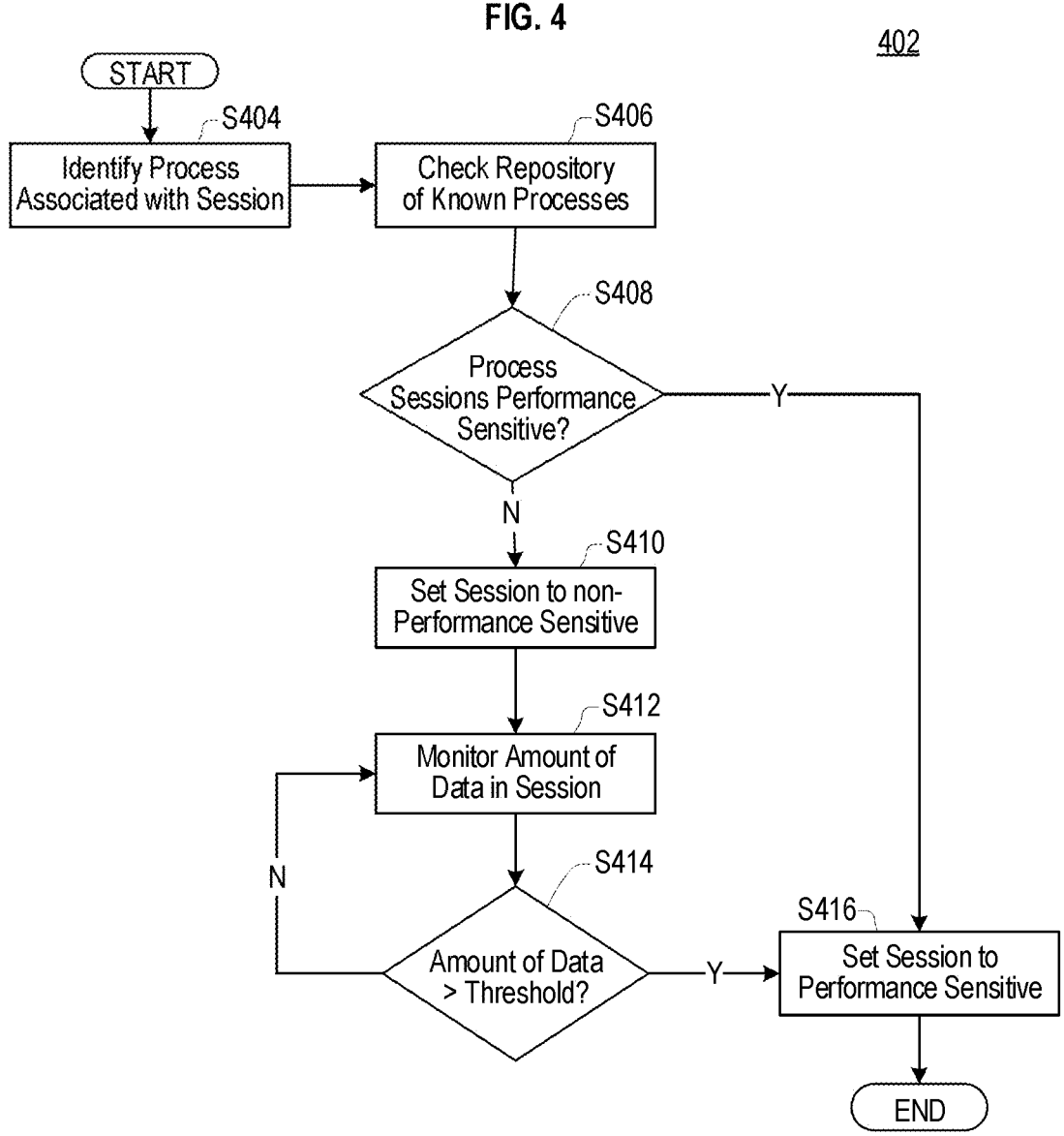

GREEDY USER EQUIPMENT DATA TRANSPORT NETWORK SELECTION

CROSS REFERENCE TO RELATED APPLICATIONS

This application claims the benefit of U.S. Provisional Application No. 62/745,063, filed on Oct. 12, 2018, which is incorporated by reference herein for all purposes.

BACKGROUND

To provide optimal area coverage, many wireless data networks are comprised of data transport nodes (DTNs), each of which covers a geographic area or sub areas which typically neighbor and overlap one another. As a result, at any particular time, a user equipment terminal (UE) may have the opportunity to connect to many DTNs. Typically, the UE may connect to only one of the available DTNs of any particular Radio Access Technology (RAT) at a time.

Depending on random distributions of users and varying demand for data services, the total network throughput speed varies from DTN to DTN. Adjoining or overlapping networks may have dramatically different transport capabilities, like throughput, latency, number of other concurrent connections, constantly changing over time.

Typically, a user would prefer to have the best possible experience. But two users in a same area accessing the same DTN provider (for example, the same cellular provider) even using the same application (e.g., a streaming-video application) may, when respectively connected to neighboring DTNs, experience dramatically different performance, resulting in the user connected to the less performant DTN having a negative experience compared to the user connected to the more performant DTN.

BRIEF SUMMARY OF THE DISCLOSURE

An objective of the disclosed embodiments is to provide a better user experience by selecting which of a plurality of available DTNs to use based on an estimate of which of the DTNs will provide the best or at least adequate performance. The objective may be to provide a better user experience for use-cases that involve performance-sensitive data sessions, such as high-definition video streaming, high-performance gaming, and the like.

According to various embodiments of the present disclosure, a method performed by a wireless device comprises determining whether a data session is performance sensitive, and in response to the data session being performance sensitive, selecting a data transport node (DTN) and performing the data session using the selected DTN.

According to various embodiments of the present disclosure, a device comprises a processor and a non-transitory computer-readable medium storing computer programming instructions. The computer programming instructions, when executed by the processor, cause the device to perform determining whether a data session is performance sensitive, and in response to the data session being performance sensitive, selecting a data transport node (DTN) and performing the data session using the selected DTN.

In an embodiment, determining whether the data session is performance sensitive includes identifying a process associated with the data session, determining, using a repository of known processes, whether the process is likely to generate performance-sensitive data sessions, and in response to determining that the process is likely to generate performance-sensitive data sessions, determining that the data session is performance sensitive.

In an embodiment, determining whether the data session is performance sensitive includes monitoring an amount of data communicated by the data session, and in response to the amount of data communicated by the data session in a predetermined time being greater than a predetermined first threshold, or to a time for the amount of data communicated by the data session to reach a predetermined amount being less than a second threshold, determining that the data session is performance sensitive.

In an embodiment, selecting the DTN includes selecting the DTN according to a performance requirement of the data session.

In an embodiment, selecting the DTN includes selecting the DTN from a list of available DTNs.

BRIEF DESCRIPTION OF THE DRAWINGS

FIG. 3 is a flow chart illustrating a process for selecting and using a Data Transport Node (DTN) according to an embodiment.

FIG. 4 is a flow chart illustrating a process for determining whether a data session is a performance-sensitive data session according to an embodiment.

DETAILED DESCRIPTION

The present disclosure relates to networking, and in particular to wireless networking. Embodiments of the present disclosure relate to how a device which can connect to a plurality of DTNs determines which of those DTNs to connect to.

According to various embodiments, a user device, such as a User Equipment (UE) in a wireless network, selects which of a plurality of DTNs to connect to based on a prediction or estimate of how well each DTN of the plurality of DTNs will satisfy the network performance requirements of a data session being or about to be performed by the user device.

Figure 1:
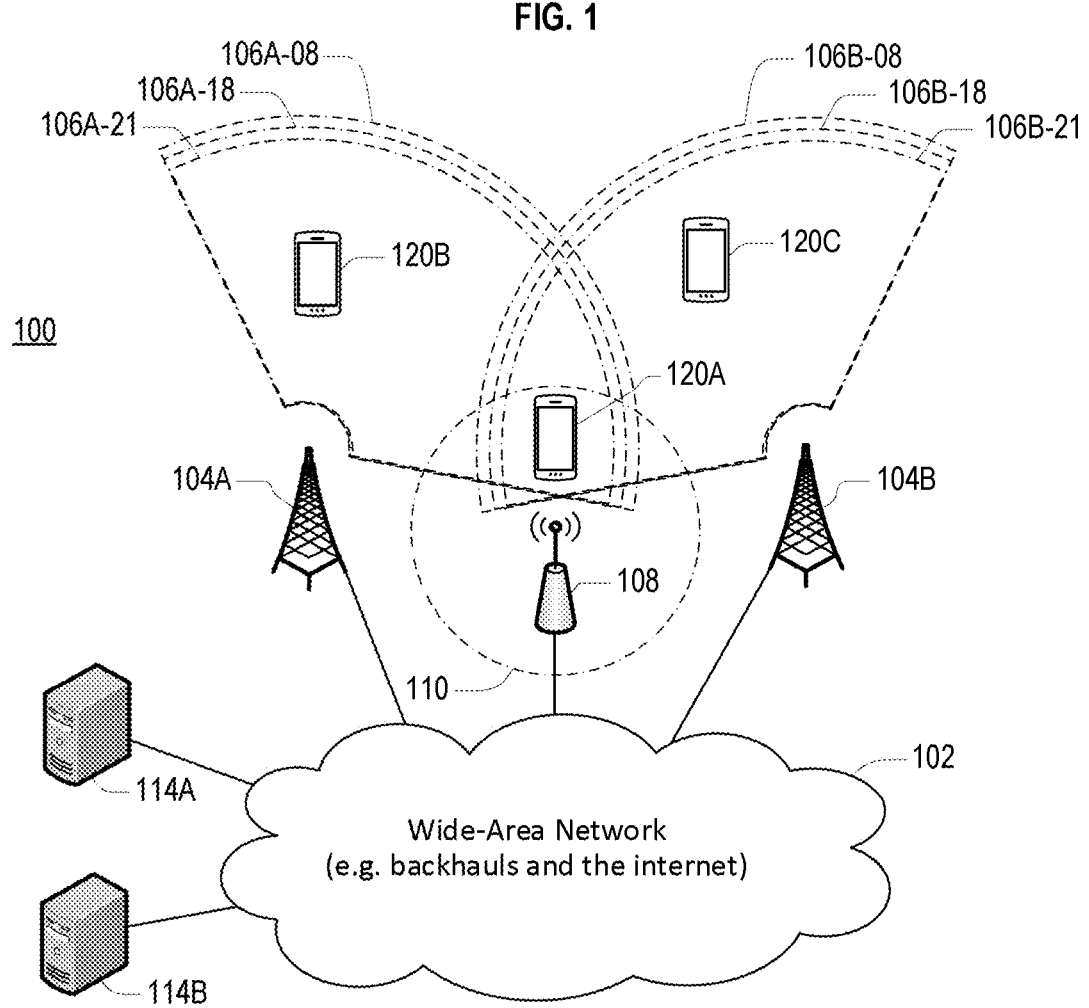
FIG. 1 illustrates a communication network according to an embodiment.

FIG. 1 illustrates a communication network 100 according to an embodiment. The network 100 includes a Wide-Area Network (WAN) 102 (for example, the Internet), a plurality of cellular base stations 104A and 104B, a WiFi Access Point (AP) 108, and a plurality of servers 114A and 114B attached to the WAN 102. However, embodiments are not limited thereto. The communication network 100 operates to allow communication between a plurality of User Equipments (UEs) 120A, 120B, and 120C and the servers 114A and 114B. Each of the cellular base stations 104A and 104B and the WiFi AP 108 may operate as one or more Data Transport Nodes (DTNs).

The first base station 104A provides a plurality of cells for performing wireless data communications with UEs within its cells. In embodiments, the cells are organized into sectors, each sector covering a portion of the area around the first base station 104A. The first base station 104A shown in FIG. 1 organizes its cells into three sectors each covering approximately 120 degrees, of which only one sector is shown.

The sector of the first base station 104A shown in FIG. 1 includes three cells: a first cell 106A-08 operating at 800 MHz, a second cell 106A-18 operating at 1800 MHz, and third cell 106A-21 operating at 2100 MHz. A UE within a sector may connect to any of the cells in that sector; typically, a UE would only connect to one of the cells at any one time. Each of the cells 106A-08, 106A-18, and 106A-21 constitutes a DTN.

The second base station 104B is similar to the first base station 104A, and a sector of second base station 104B is shown in FIG. 1, the sector providing a fourth cell 106B-08 operating at 800 MHz, a fifth cell 106B-18 operating at 1800 MHz, and sixth cell 106B-21 operating at 2100 MHz, each of which constitutes a DTN.

The WiFi AP 108 provides a Wireless Local Area Network (WLAN) 110, and operates to allow UEs within that WLAN 110 that have WiFi capability to perform wireless data communications. Although only one WLAN 110 is shown for WiFi AP 108, embodiments are not limited thereto, and the WiFi AP may provide a plurality of WLANs that may be at different frequencies (such as at 2.4 GHz and 5 GHz), each of which constitutes a DTN.

The first UE 120A is within the coverage of the cells of the first base station 104A and second base station 104B and within the coverage of the WLAN 110 of the WiFi AP 108. As a result, the first UE 120A can wirelessly communicate using the first and fourth cells 106A-08 and 108B-08 if the first UE 120A has 800 MHz cellular capability, using the second and fifth cells 106A-18 and 108B-18 if the UE 120A has 1800 Hz cellular capability, using the third and sixth cells 106A-21 and 108B-21 if the first UE 120A has 2100 MHz cellular capability, and using the WLAN 110 if the first UE 120A has WiFi capability. Accordingly, the first UE 120A in the example shown in FIG. 1 may have up to eight available DTNs. Typically, the UE 120A may only communicate using one cell and, optionally, one WiFi AP at any time.

The second UE 120B is only within the coverage of the first, second, and third cells 106A-08, 106A-18, and 106A-21, and therefore may only communicate using those cells, depending on whether it has 800, 1800, or 2100 MHz capability, respectively, and accordingly may have up to three available DTNs. The third UE 120C is only within the coverage of the fourth, fifth, and sixth cells 106B-08, 106B-18, and 106B-21, and therefore may only communicate using those cells, depending on whether it has 800, 1800, or 2100 MHz capability, respectively, and accordingly may have up to three available DTNs.

The first, second, and third UEs 120A, 120B, and 120C may each comprise a cell phone, a computer, a laptop computer, a tablet, a handheld device, a handset device, a smart television, a smart watch, or a combination thereof. In certain embodiments, a UE terminal is a device capable of wirelessly connecting with a data transport network The communication performance that the first UE 120A obtains may depend on which DTN the first UE 120A uses to perform communications. For example, if the second UE 120B and other UEs in the sector of first base station 104A are saturating the connection between first base station 104A and the WAN 102, the first UE 120A may be able to obtain better performance by communicating using a DTN of the second base station 104B instead of a DTN of the first base station 104A. In another example, if the second UE 120B and other UEs in the sector of first base station 104A are causing congestion in the first cell 106A-08 of the first base station 104A, the first UE 120A may be able to obtain better performance by communicating using the second cell 106A-18 or the third cell 106A-21 of the first base station 104A instead of the first cell 106A-08 of the first base station 104A.

The situations mentioned above may also apply with respect to the WiFi AP 108. For example, if the WiFi AP 108 is a WiFi access point in a hotel, whether the WLAN 110 provides better performance than the first and second base stations 104A and 108B may depend on how much WiFi traffic the other residents of the hotel are generating.

As noted above, each cell provided by the base stations 104A and 104B and each WLAN provided by the WiFi AP 108 may be considered a Data Transport Node (DTN). In embodiments, a UE such as the first UE 120A, second UE 120B, or third UE 120C operates to select an available DTN that is likely to provide the highest performance for a communication operation (for example, a data session) that the UE is conducting, and thereby provide a better experience to the user of that UE.

Figure 2:
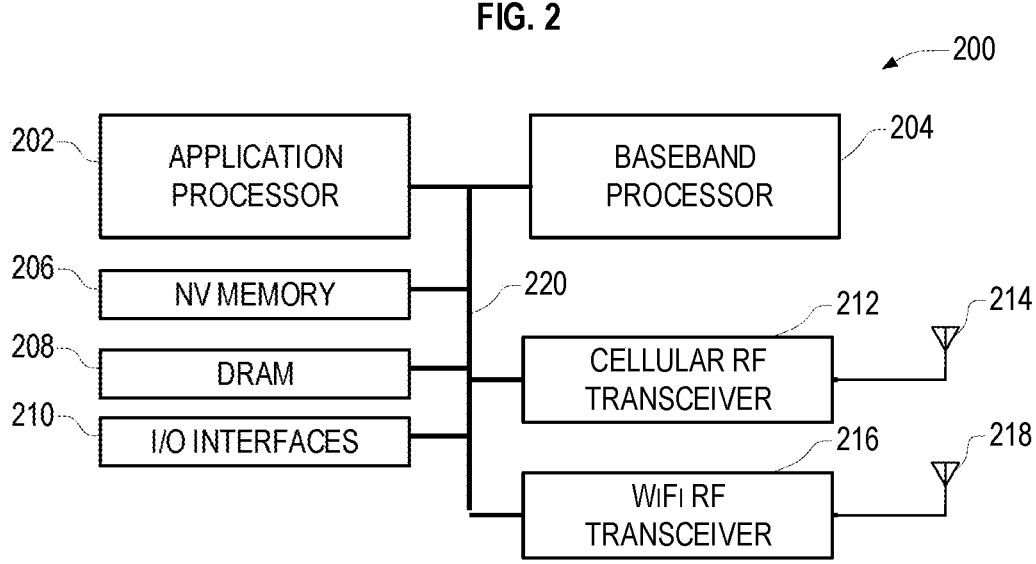
FIG. 2 illustrates components of a User Equipment (UE) according to an embodiment.

FIG. 2 illustrates components of a User Equipment (UE) 200 according to an embodiment. The UE 200 may be included in any or all of the UEs 120A, 120B, and 120C of FIG. 1. The UE 200 includes an application processor 202, a baseband processor 204, a Non-Volatile (NV) memory 206, a Dynamic Random Access Memory (DRAM) 208, Input/Output (I/O) interfaces 210, a cellular RF transceiver 212, a cellular antenna 214, a WiFi RF transceiver 216, and a WiFi antenna 218, all of which may communicate with each other via a bus 260. The UE 200 is capable of wirelessly connecting to one or more data transport networks through DTNs such as the cellular base stations 104A and 104B and the WiFi AP 108 of FIG. 1.

The application processor 202 executes applications, such as email clients, web browser, video applications, and the like. The application processor 202 may also perform management activities for the UE 200. The application processor 202 may utilize the NV memory 206 and the DRAM 208, either or both of which may include a non-transitory computer readable medium having software (e.g., computer programing instructions) and data stored therein.

The baseband processor 204 performs baseband signal processing and may also communicate information between the application processor 202 and the RF transceivers 212 and 216. The baseband processor 210 may software and data stored in the NV memory 206 and the DRAM 208. In an embodiment, separate baseband processor may exist for each of cellular and WiFi communications.

The Cellular RF transceiver 212 includes a cellular RF transmitter and a cellular RF receiver. The Cellular RF transceiver 212 is configured to transmit first information received from the baseband processor 204 to a cellular DTN through the cellular antenna 214, and provide second information received through the cellular antenna 214 from the cellular DTN to the baseband processor 204.

The WiFi RF transceiver 216 includes a WiFi RF transmitter and a WiFi RF receiver. The WiFi RF transceiver 216 is configured to transmit third information received from the baseband processor 204 to a WiFi DTN through the WiFi antenna 218, and provide fourth information received through the WiFi antenna 218 from the WiFi DTN to the baseband processor 204.

Input interfaces of the I/O interfaces 210 receive information from a user, and output interfaces of the /O interfaces 210 output information to the user. The input interfaces may include one or more of a keyboard, keypad, mouse, touchscreen, microphone, and the like. The output interfaces may include one or more of a display device, touch screen, speaker, and the like. I/O interfaces 210 may also include interfaces to external devices.

As described herein, many functions of the UE 200 may be implemented in either hardware or software. Which functions are implemented in software and which functions are implemented in hardware will vary according to constraints imposed on a design. The constraints may include one or more of design cost, manufacturing cost, time to market, power consumption, available semiconductor technology, and so on.

As described herein, a wide variety of electronic devices, circuits, firmware, software, and combinations thereof may be used to implement the functions of the components of the UE 200. Furthermore, the UE 200 may include other components, such as storage interfaces, clock generator circuits, power supply circuits, and the like, which have been omitted in the interest of brevity.

The UE 200 may seek to access a particular host (e.g., a video streaming host such as Youtube.com) and there may be more than one DTNs available through which it could connect to that host. When the UE 200 accesses the host (either by using an application or through a web browser) a data session is created. Embodiments relate to determining whether said data session corresponds to a performance-sensitive data session (such as a data session including an elephant flow, as described below), and to providing better performance to performance-sensitive data sessions by selecting a DTN likely to provide higher performance for the data session from among a plurality of DTNs currently available to the UE 200.

FIG. 3 illustrates a process 300 for selecting and using a Data Transport Node according to an embodiment. The process 300 may be performed by a UE such as the UE 120A of FIG. 1.

At S302, the process 300 determines whether a data session to be performed is a performance-sensitive data session; that is, whether insufficient downlink and/or uplink performance for the data session might lead to a poor user experience. Performance-sensitive data sessions may include, for example, video streaming data sessions (especially high-resolution video streaming), where poor downlink performance may lead to artifacts in the video or stuttering of the video, and gaming data sessions, where poor uplink or downlink performance may place a player of the game at a disadvantage against other players.

The process 300 may determine whether the data session is performance sensitive by consulting a database, by monitoring the data session, or both. The process 300 may use, for example, the process 402 described with respect to FIG. 4 to make this determination.

At S304, when the data session is performance-sensitive, the process 300 proceeds to S306; otherwise, the process 300 proceeds to S308.

At S306, the process 300 selects a Data Transport Node (DTN) likely to provide the best performance for the data session, and then uses the selected DTN to perform the data session. The process 300 may select the DTN using, for example, the process 506 described with respect to FIG. 5. When the data session is terminated, the process 300 ends.

At S308, the process 300 performs the data session using whichever DTN the UE was connected to at the start of the process 300. If the UE was not connected to a DTN at the start of the process 300, the process 300 may choose one using any of the process for selecting a DTN described herein, or using a process known in the art.

In the embodiment shown in FIG. 3, at S308 the process 300 ends when the data session is terminated, but embodiments are not limited thereto. In an embodiment, at S308, after the process 300 has performed the data session for a predetermined period of time, the process 300 proceeds to S302 and re-determines whether the data session is performance-sensitive.

FIG. 4 illustrates a process 402 for determining whether a data session is a performance-sensitive data session according to an embodiment. The process 402 may be used in S302 of the process 300 of FIG. 3.

At S404, the process 402 identifies a process associated with the data session. Identifying the process associated with the data session may include determining a unique identifier associated with an application that is performing the data session. For example, an application for streaming videos may have a first unique identifier, an application for performing Voice over IP (VOIP) may have a second unique identifier, a video chat application may have a third unique identifier, and so on. The unique identifier may be determined by, for example, identifying a process performing the data session, identifying the application that the process belongs to, and obtaining from an operating system a unique identifier associated with that application.

At S406, the process 402 checks, using the unique identifier, a repository of known processes to determine whether the process is likely to generate data sessions that are performance-sensitive. The repository of known processes may have been created using analytical techniques (e.g., machine learning) to measure the likelihood that an application has relatively higher data requirements and/or a relatively longer duration than other data sessions traversing a network. For example, a video streaming application is likely to have higher data requirements than a typical process. On the other hand, SMS, Voice-over-IP, and Internet-of-Things applications, for example, are less likely to have higher-than-typical data requirements.

If the unique identifier is associated in the repository of known processes with a likelihood of needing data throughput greater than a first threshold or a likelihood of having a duration longer than a second threshold, the process is determined to generate performance-sensitive data sessions.

The repository of known processes may also indicate whether a process is likely to generate data sessions having higher than usual performance requirements in uplink communications, in downlink communications, or both.

A data session having higher than usual performance requirements may be considered an "elephant flow." A data session not having higher than usual performance requirements may be considered a "standard flow."

At S408, when the repository of known processes indicates that the process is likely to generate elephant flows, the process 402 proceeds to S416; otherwise, the process 402 proceeds to S410.

At S410, the process 402 initially designates the data session associated with the process as non-performance-sensitive, that is, as a standard flow.

At S412, the process 402 monitors the data being communicated in the data session associated with the process as the data session is being performed. Either uplink, downlink, or both uplink and downlink data may be monitored. In an embodiment, the amount of data being communicated in the data session may be monitored over a predetermined period of time. In another embodiment, a time during which a predetermined amount of data is communicated by the data session may be monitored.

In an embodiment, information from monitoring one or more data sessions associated with a process that is not in the repository of known processes is accumulated until a predetermined number of data sessions for that process have been monitored. Once the predetermined number of data sessions associated with the process have been monitored, a determination of whether the process is likely to be associated with performance-sensitive data sessions is made using the information from the monitoring and the determination is stored in association with the process in the repository of known processes.

At S414, the process 402 determines whether the amount of data communicated by the data session, for example, an amount of data communicated during the predetermined period of time, exceeds a threshold. The threshold can be static or dynamic. If the amount of data exceeds the predetermined threshold, at S414 the process 402 proceeds to S416; otherwise the process 402 proceeds to S412.

At S416, the process 402 designates the data session associated with the process as performance-sensitive, that is, as an elephant flow. In an embodiment, the process 402 may designate the data session as uplink performance sensitive, downlink performance sensitive, or both, according to either the information in the repository of known processes consulted in S406 or the amount of uplink and/or downlink data monitored in S412. The process 402 then exits.

Once a data session is designated performance-sensitive (e.g., designated an elephant flow) the data session retains that designation until it is explicitly terminated or until it is terminated by an idle timeout. For example, in an embodiment, any data session that is idle for 20 seconds is considered terminated. Data packets associated with a same process or targeting a same destination as a terminated data session are considered part of a new data session.

Figure 5:
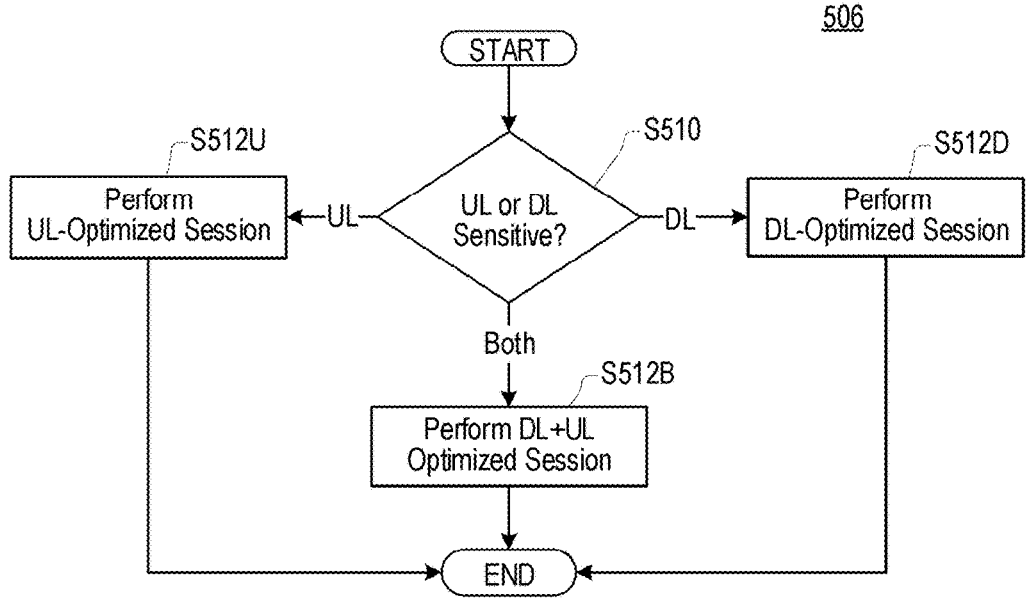
FIG. 5 is a flow chart illustrating a process for selecting and using a DTN to optimize for either Uplink (UL) or Downlink (DL) performance according to an embodiment.

FIG. 5 illustrates a process 506 for selecting and using a DTN to optimize for either Uplink (UL) or Downlink (DL) performance according to an embodiment. The process 506 may be used in S306 of the process 300 of FIG. 3.

At S510, the process 506 determines whether a performance-sensitive data session (such as an elephant flow) has been designated as UL performance sensitive and/or UL performance sensitive. When the data session has been designated as UL performance sensitive and not as DL performance sensitive, at S510 the process 506 proceeds to S512U. When the data session has been designated as DL performance sensitive and not as UL performance sensitive, at S510 the process 506 proceeds to S512D. When the data session has been designated as both DL and UL performance sensitive, at S510 the process 506 proceeds to S512B.

In an embodiment without S512B, when the data session has been designated as both UL and DL performance sensitive, the process 506 may use a predetermined tie-breaking rule to determine which of S512U and S512D to proceed to.

In an embodiment, when the data session has not been designated as UL or DL performance sensitive, the process 506 may use a predetermined default rule to determine which of S512U, S512D, and S512B (if present) to proceed to.

Figure 6:
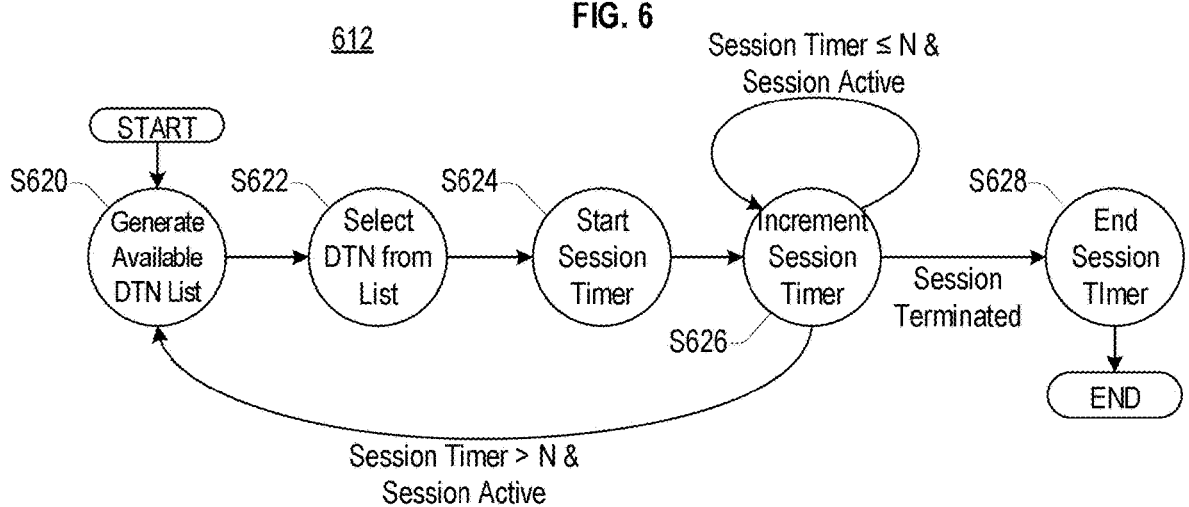
FIG. 6 is a state machine diagram illustrating a data session optimization process according to an embodiment.

At S512U, the process 506 performs the data session in an UL-optimized manner, such as by performing the process 612 of FIG. 6 for UL data flow. The process 506 then ends.

At S512D, the process 506 performs the data session in an DL-optimized manner, such as by performing the process 612 of FIG. 6 for DL data flow. The process 506 then ends.

At S512B, the process 506 may perform the data session optimized for an aggregate performance that combines both UL and DL performance. For example, in an embodiment, the data session may have an UL performance target and a DL performance target, and the data session may be optimized to meet both performance targets. In another embodiment, the data session may have weights for each of UL and DL performance, and the data session may be optimized for a sum of the UL and DL performance each scaled by the respective weight.

FIG. 6 is a state machine diagram illustrating a process 612 for data session optimization of a data session that is sensitive to UL performance, DL performance, or both, according to an embodiment. The process 612 may be used in any or all of S512U (by optimizing for UL data flow), S512D (by optimizing for DL data flow), and S512B (by optimizing for an UL+DL aggregate data flow) of the process 506 of FIG. 5, or may be used to optimize for an aggregate performance that combines both UL and DL performance.

At S620, the process 612 generates a list of available Data Transport Nodes (DTNs). The list may include DTNs on different frequencies, using different RATs, located at different base stations or access points, and so on. The process 612 then transitions to S622.

At S622, the process 612 selects a DTN from the list of available DTNs and, if the selected DTN is not the DTN the device performing the process 612 is currently connected to, connects to the selected DTN in order to perform the data session. In an embodiment, the process 612 may select an available DTN that has the highest probability of providing the highest DL (for a data session sensitive to DL performance), UL (for a data session sensitive to DL performance), or combined performance, (for a data session sensitive to both) according to which the data session is sensitive to. In another embodiment, the process 612 may select an available DTN that will provide adequate performance.

A plurality of DTNs may satisfy the selection criteria used at S622. For example, there may be a tie for which DTN provides the highest pertinent performance, or there may be a plurality of DTNs that provide adequate performance. In embodiments, when a plurality of DTNs satisfy the selection criteria, the process S612 uses a "good neighbor" policy to select a DTN from that plurality of DTNs. When selecting a DTN out of the plurality of DTNs that satisfy the selection criteria, the "good neighbor" policy seeks to minimize the negative impact that the selection may have on other users of the wireless network. For example, because most users of radio networks are at the edges of cell coverage radius, when two DTNs that meet the selection criteria operate in different frequency bands, and the lower of the frequency bands provides greater geographic coverage, the process S612 may select the DTN having the higher frequency band in order to not reduce the utility of the DTN having the lower frequency band to more distant users who may only be able to use the DTN having the lower frequency band.

At S622, once a DTN is selected the process 612 then transitions to S624.

At S624, the process 612 starts a session timer and then transitions to S626.

The process 612 remains in S626, incrementing the session timer, as long as the session timer has a value less than or equal to a predetermined value N and the data session being optimized is not terminated. When the data session is terminated, the process 612 transitions to S628. When the session timer has a value greater than the predetermined value N and the data session is still active, the process 612 transitions to S620 to re-evaluate whether the current DTN is likely to be the best DTN for the data session.

At S628, the process 602 ends the session timer and then exits.

Figure 7:
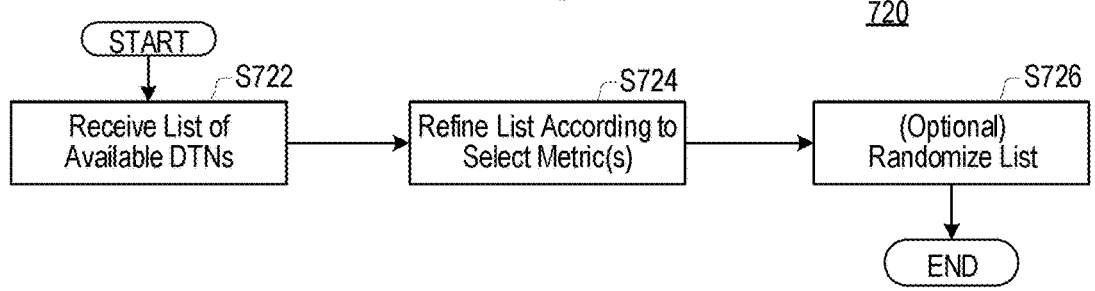
FIG. 7 is a flow chart illustrating a process for generating a list of available DTNs according to an embodiment.

FIG. 7 illustrates a process 720 for generating an available DTN list according to an embodiment. The process 720 may be used in S620 of the process 612 of FIG. 6.

At S722, the process 720 receives a list of available DTNs that the device performing the process 720 can attach to. The list of available DTNs may have been generated by the device probing for DTNs that the device can connect to among the data transport networks available to the device. In an embodiment, the list of available DTNs received by the process 720 is generated by means known in the art.

At S724, the process 720 may refine the list of available DTNs. The list of DTNs may be refined by, for example, limiting the list to DTNs according to characteristic of the DTN such as a Channel Quality Indication (CQI), a Signal to Interference plus Noise Ratio (SIRN), a Received Signal Strength Indication (RSSI), a Reference Signal Received Power (RSRP), a Reference Signal Received Quality (RSRQ), a channel size, a throughput, a Modulation and Coding Scheme (MCS), a Round Trip Time (RTT) or other latency, a block failure to success ratio, a channel size, or the like. In embodiments, the process 720 may refine the list to include only DTNs having the characteristic better that a predetermined threshold or in a predetermined upper percentile of the received list of available DTNs. For example, in an embodiment the process 720 may refine the received list of available DTNs to only include DTNs with RTTs of less than 60 milliseconds, a throughput of 5 megabits per second, or both.

The received list of available DTNs may also be refined according to preferred Radio Access Technologies (RATs), preferred operators, whether the DTNs support carrier aggregation, a cell ID mode, a preferred band or subchannel, or the like.

At S726, the process 720 may randomize the refined list of available DTNs by reordering the list according to the output of a random number generator (RNG) or pseudo-random number generator (PRNG). By randomizing the list, the process 720 makes it more likely that different devices using the same or similar embodiment will select different DTNs to perform similar data sessions.

Figure 8:
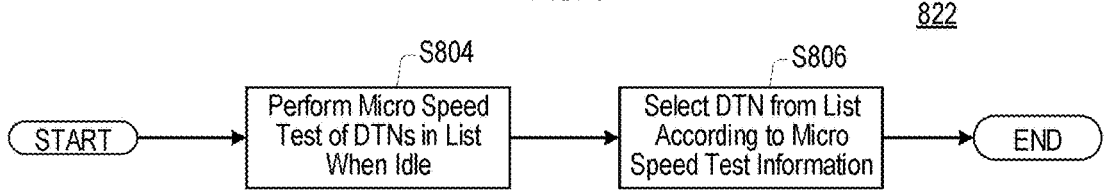
FIG. 8 is a flow chart illustrating a process for selecting a DTN from a list according to an embodiment.

FIG. 8 illustrates a process 822 for selecting a DTN from a list of available DTNs using passive mode sampling according to an embodiment. Portions of the process 822 (e.g., S806) may be used in S622 of the process 612 of FIG. 6. Other portions of the process 822 (e.g. S804) may be performed before S622 of the process 612 of FIG. 6, such as, for example, when no performance-sensitive data sessions are being performed.

At S804, while the device perform the process 822 is not performing a data transfer, the process 822 performs micro-speed tests of one or more of DTNs from the list of available DTNs. A micro speed test may or may not use a content server in the data path of the test. A target of the micro speed test may be either directly in the mobile network or external to the mobile network (e.g. Internet). A micro speed test may consist of but is not limited to measuring the RTT or half-RTT latency of a DTN by sending and/or receiving empty data packets, or measuring a throughput capability of a DTN by sending data packets. In an embodiment, the device performing the process 822 disconnects from a previously connected-to DTN and connects to the DTN to be tested in order to perform the micro speed test.

In an embodiments, the information collected from the micro speed tests further includes information collected by other devices performing micro speed tests which send the information they collect from their respective micro speed tests to the device performing the process 822.

In an embodiment, DTN transport capabilities are assessed by measuring the delivery performance of packets sent over the visible (to the UE) DTNs to determine the transport capabilities (e.g., maximum throughput, lowest latency, and the like) of each DTN. The data packets travel between the UE terminal and a content server (e.g., a streaming video server or game server). The higher amount of data sent/received, the more accurate the throughput prediction can be. To save resources such as processing speed or overall data consumption a limited number of packets could be sent since it may not be necessary to have a high accuracy assessment of each DTN's performance. Instead, embodiments may seek to determine whether a DTN is likely to be more performant than its adjoining neighbors.

For example, in a testing interval of 0.25 second, a first DTN may be estimated to have a throughput of 50 kbps, and a second DTN may be estimated to have a throughput of 100 kbps. If each DTN was tested over several seconds, their overall throughputs might be much higher than the results of the 0.25 second calculations indicated. However, there is a high probability that the true speed of the second DTN having the 100 kbps estimated throughput is greater than the true throughput of the first DTN having the 50 kbps estimated throughput. Therefore the UE would probably experience the best performance if it connects to the second (100 Kbps) DTN.

At S806, the process 822 selects, using the information collected from the micro speed tests, a DTN from the list of available DTNs. In an embodiment, the process 822 selects the first DTN that, as determined using the information collected from the micro speed tests, meets a target performance threshold (i.e., should provide adequate performance), which target threshold may be predetermined or may be associated with a data session for which the DTN is being selected. In an embodiment, the process 822 selects the cell with, as determined using the information collected from the micro speed tests, the highest DL, UL, or aggregated UL/DL measured performance, according to whether the data session for which the DTN is being chosen is sensitive to DL performance, UL performance, or both. Performance may be measured using latency, UL throughput, DL throughput, and the like, or combinations thereof. The process 822 then exits.

Figure 9:
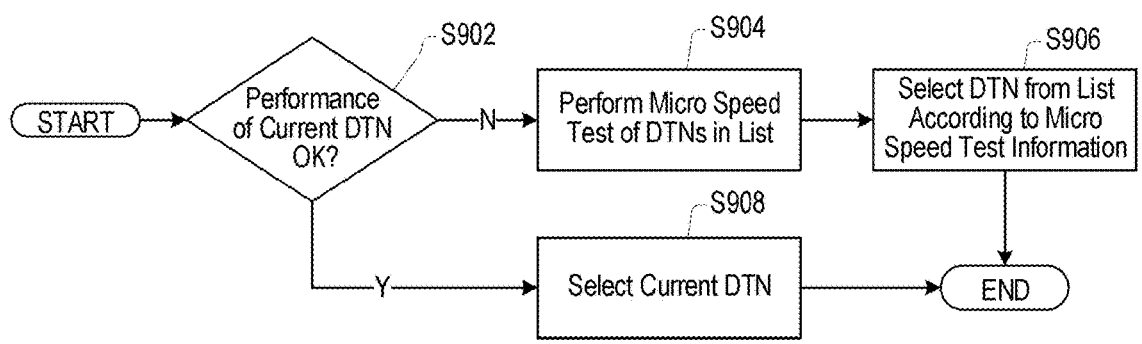
FIG. 9 is a flow chart illustrating a process for selecting a DTN from a list according to another embodiment.

FIG. 9 illustrates a process 922 for selecting a DTN from a list of available DTNs according to an embodiment. The process 922 may be used in S622 of the process 612 of FIG. 6. One or more portions of the process 922 may be performed while the data session being optimized is in progress.

At S902, the process 922 determines whether the DTN that the device is currently using to perform the data session being optimized is providing adequate performance. The process 922 may do this by measuring statistics of the data session, such as latency or throughput. In an embodiment, determining whether the currently-in-use DTN is providing adequate performance may be performed by monitoring an indicator from the process performing the data session being optimized, such as a stall indicator from a video streaming app.

When the currently-in-use DTN is providing adequate performance, at S902 the process 922 proceeds to S908; otherwise, the process 922 proceeds to S904.

At S904, the process 922 performs micro speed tests of one or more DTNs (other than the currently-in-use DTN) in the list of available DTNs, as described with respect to S804 of FIG. 8, above.

In an embodiment, the process 922 may perform the micro speed test of the available DTNs using respective portions of the data session and measure the performance achieved in performing that portion. For example, the process 922 may perform a first 0.25 seconds of a video data session on a first DTN to assess the first DTN's performance, perform a second 0.25 seconds of the video data session on a second DTN to assess the second DTN's performance, and so on, and thus seek to continue to provide the data session as a new DTN for performing it is sought.

At S906, the process 922 selects, using the information collected from the micro speed tests, a DTN from the list of available DTNs, as described with respect to S806 of FIG. 8. The process 922 then exits.

In embodiments, other techniques for selecting a new DTN may be used instead of those described with respect to S904 and S906. For example, in an embodiment, S904 and S906 might be replaced by S1004 and S1006 of FIG. 10 (i.e., a calculation using DTN metrics and properties may be used to select a DTN), by S1104 and S1106 of FIG. 11 (i.e., historical performance information may be used to select a DTN, by S1204 and S1206 of FIG. 12 (i.e., a DTN may be selected randomly), and so on.

At S908, the process 922 selects the currently-in-use DTN as the selected DTN. The process 922 then exits.

Figure 10:
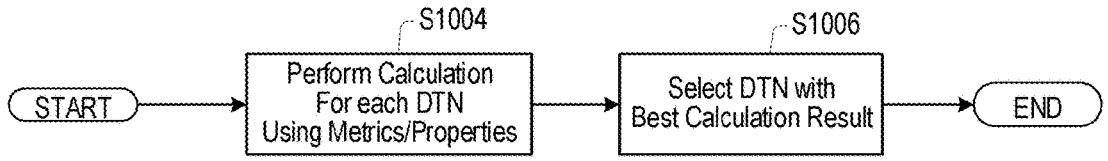
FIG. 10 is a flow chart illustrating a process for selecting a DTN from a list according to another embodiment.

FIG. 10 illustrates a process 1022 for selecting a DTN from a list of available DTNs according to an embodiment. The process 1022 does not use testing, instead using on or more metrics associated with the DTNs to make a "best guess" selection from among the available DTNs. The process 1022 may be used in S622 of the process 612 of FIG. 6.

At S1004, the process 1022 performs respective calculations for the DTNs in the list of available DTNs to determine which DTN is most likely to provide the desired performance. The respective calculations use one or a combination of more than one of respective properties of the DTNs, such as a Channel Quality Indication (CQI), a Signal to Interference plus Noise Ratio (SIRN), a Received Signal Strength Indication (RSSI), a Reference Signal Received Power (RSRP), a Reference Signal Received Quality (RSRQ), a channel size, a throughput, a Modulation and Coding Scheme (MCS), a Round Trip Time (RTT) or other latency, a block failure to success ratio, a channel size, a Radio Access Technologies (RATs), whether the DTN is operated by a preferred operator, whether the DTNs support carrier aggregation, or the like.

In an embodiment, a DTN having a higher calculation result is more likely to provide the desired performance. The desired performance can be UL performance, DL performance, or an aggregate of both, according to the data session being optimized. The desired performance can be, for example, low latency, high throughput, or a combination thereof.

At S1006, the process 1022 selects the DTN that has the best calculation result (e.g., the highest result) from the list of available DTNs as the selected DTN. The process 1022 then exits.

Figure 11:
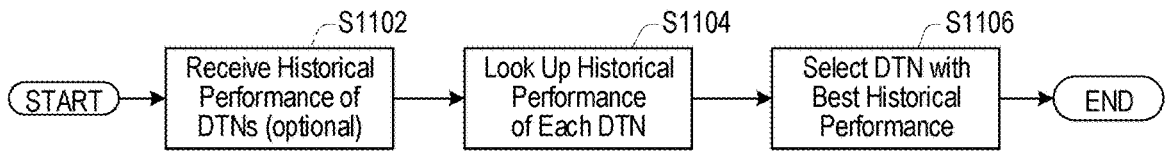
FIG. 11 is a flow chart illustrating a process for selecting a DTN from a list according to another embodiment.

FIG. 11 illustrates a process 1122 for selecting, using historical performance information, a DTN from a list of available DTNs according to an embodiment. The process 1122 may be used in S622 of the process 612 of FIG. 6.

At S1102, the process 1122 may optionally receive, from another device, respective historical performance information for DTNs in the list of available DTNs. The other device may be a network element of the network the device performing the process 1122 is part of, wherein the network element is configured to store and distribute historical performance information regarding DTNs. The historical performance information stored and distributed by the network element may be generated by the network element or received by the network element from one or more other devices.

At S1104, the process 1122 determines, for each DTN in the list of available DTNs, the historical performance of that DTN. The process 1122 uses historical performance information for DTNs accumulated by the device performing the process 1122 and any historical performance information for DTNs received at S1102 to determine the respective historical performance of the DTNs in the list of available DTNs. The historical performance information may include results of prior micro-speed tests, results of monitoring of prior user-generated sessions, and the like. In an embodiment, the process 1122 uses respective identifiers of the DTNs in the list of available DTNs to look for respective information on the DTNs in the available historical performance information.

The historical performance information may include performance metrics for DTNs previously used by the device. The historical performance information may include specific performance information for often-used websites (e.g., a popular video streaming website) or specific performance information for an often-used website for each of a plurality of often-used DTNs. The historical performance information for a website or DTN or combination thereof may include separate entries for each day of the week and/or for each of a plurality of portions of the day. The historical performance information may include separate UL and DL performance information.

In an embodiment, a device performing the process 1122 accumulates historical performance data over time. In an embodiment, the device keeps track of the age of historical performance information and uses the age of the information to determine when to take new measurements.

At S1106, the process 1122 selects the DTN having the highest historical performance from among the list of available DTNs. When the data session being optimized is primarily sensitive to DL performance, the DTN with the best historical DL performance is selected. When the data session being optimized is primarily sensitive to UL performance, the DTN with the best historical UL performance is selected. When the data session being optimized is sensitive to both UL and DL performance, and measure of combined UL and DL performance is used to select the DTN. Performance may be measured by one or more of latency, throughput, total data capacity, and so on. The process 1122 then exits.

Figure 12:
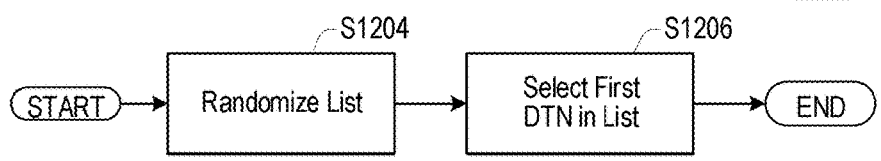
FIG. 12 is a flow chart illustrating a process for selecting a DTN from a list according to another embodiment.

FIG. 12 illustrates a process 1222 for randomly selecting a DTN from a list of available DTNs according to an embodiment. The process 1222 may be used in S622 of the process 612 of FIG. 6.

At S1204, the process 1222 randomly (or pseudo-randomly) reorders (e.g., shuffles) the list of available DTNs. At S1206, the process 1222 selects the first DTN of the reordered list of available DTNs as the selected DTN. The process 1222 then exits.

In another embodiments, the process 1222 uses a random or pseudo-random number generator to generate an integer N in the range of 1 to the length of the list of available DTNs, and then selects the Nth element of the list of available DTNs as the selected DTN. The process 1222 then exits.

Embodiments include user devices, and in particular wireless user devices such a s User Equipment (UE), that attempt to optimize the performance of performance-sensitive data sessions by selecting which DTN to connect to and use according to the predicted ability of each available DTN to provide the performance required by a performance-sensitive data session. The selected DTN may not be the least congested, may not have the highest signal strength or RSRP, and generally may not be the DTN that the network operator would prefer the user device use. Instead of a user device probing for available transport networks depending on, for example, best signal strength (which ignores the actual available capacity of the DTN), the system and method described proposes for a user device to directly probe the available transport networks and decide which to use based on measured performance capabilities, and in particular based on measured performance capabilities that are pertinent to the data session for which optimal network performance is sought.

Embodiments eschew load balancing. In embodiments, a user device probes the available transport networks and decides which to use based on performance measurements (as opposed to UEs connecting to LTE networks based on their probing for optimal signal strength.) This system and method is greedy because it prioritizes maximum possible performance for an individual user device instead of considering the sharing of resources with other users.

Embodiments have periodic checks during extended sessions to allow the user device to periodically check whether the originally determined "best DTN" is still providing adequate or optimal performance and to allow the user device to switch DTNs if needed. The process can be used for both primarily uplink and downlink connections to find the optimal channel.

Embodiments are not limited to a single data transport technology, there could be a mix of networks including but not limited to radio access technologies and Wi-Fi.

Although embodiments have been described with respect to specific examples, embodiments are not limited by these examples. For example, persons of skill in the art will recognize that greedily determining which DTN to use to maximize the user device's own performance of a data session may be performed according to various other algorithms and processes without departing from the scope or spirit of the present disclosure.

Once the user device establishes a connection with a particular DTN a session timer is started to monitor the length of continuous sessions. For example, video streaming sessions are typically longer than downloading small file attachments. Due to random distributions of users and varying demand for data services, it is possible for a different DTN to become a more optimal connection than the originally calculated "best" DTN. A counter increases each time a session is found to be not terminated. If the counter becomes greater than a threshold "n", return to "Check for available DTN" and re-probe for the fastest available DTN. This can allow the user device to periodically check whether the originally calculated best DTN is still performing optimally and allows the user device to switch DTNs if needed.

While several embodiments of the present disclosure have been illustrated and described herein, many changes can be made without departing from the spirit and scope of the invention. For example, it can be appreciated that the disclosure may be used in wireless networks, wired networks, fiber networks and coaxial networks alone, or in combination. Accordingly, the scope of the invention is not limited by any disclosed embodiment.

What is claimed is:

1. A method performed by a wireless device, the method comprising:
    determining whether a data session is performance sensitive; and
    in response to the data session being performance sensitive:
        selecting a data transport node (DTN), and
        performing the data session using the selected DTN,
    wherein determining whether the data session is performance sensitive includes:
        monitoring an amount of data communicated by the data session; and
        in response to the amount of data communicated by the data session in a predetermined time being greater than a predetermined first threshold, or to a time for the amount of data communicated by the data session to reach a predetermined amount being less than a second threshold, determining that the data session is performance sensitive.

2. A method performed by a wireless device, the method comprising:
    determining whether a data session is performance sensitive; and
    in response to the data session being performance sensitive:
        selecting a data transport node (DTN), and
        performing the data session using the selected DTN,
    wherein determining whether the data session is performance sensitive includes:
        identifying a process associated with the data session;
        determining, using a repository of known processes, whether the process is likely to generate performance-sensitive data sessions; and
        in response to determining, using the repository of known processes, that the process is likely to generate performance-sensitive data sessions, determining that the data session is performance sensitive.

3. The method of claim 1, wherein selecting the DTN includes selecting the DTN according to a performance requirement of the data session.

4. The method of claim 3, wherein selecting the DTN according to a performance requirement of the data session includes:
    selecting the DTN according to information regarding a downlink (DL) performance of the DTN when the performance requirement of the data session includes a DL performance requirement; or
    selecting the DTN according to information regarding an uplink (UL) performance of the DTN when the performance requirement of the data session includes a UL performance requirement.

5. The method of claim 3, wherein selecting the DTN according to a performance requirement of the data session includes selecting the DTN according to information regarding a latency performance of the DTN when the performance requirement of the data session includes a latency requirement, selecting the DTN according to information regarding a throughput performance of the DTN when the performance requirement of the data session includes a throughput requirement, or both.

6. The method of claim 1, wherein performing the data session using the selected DTN includes:
performing the data session using the selected DTN for a predetermined period of time; and
in response to the predetermined period of time elapsing, selecting a new DTN and performing the data session using the selected new DTN.

7. The method of claim 1, wherein selecting the DTN includes selecting the DTN from a list of available DTNs.

8. The method of claim 7, wherein selecting the DTN from the list of available DTNs includes selecting the DTN from the list using a random number generator or a pseudo-random number generator.

9. The method of claim 7, wherein selecting the DTN from the list of available DTNs includes selecting the DTN according to the respective results of micro speed tests performed on the list of available DTNs.

10. The method of claim 7, wherein selecting the DTN from the list of available DTNs includes selecting the DTN according to respective calculations for the list of available DTNs, wherein the calculations are based on respective metrics, respective properties, or both of the available DTNs.

11. The method of claim 7, wherein selecting the DTN from the list of available DTNs includes selecting the DTN according to historical performance information regarding the list of available DTNs.

12. The method of claim 7, wherein selecting the DTN from the list of available DTNs includes:
selecting the DTN according to a selection criteria; and
when a plurality of DTNs in the list of available DTNs meet the selection criteria, selecting the DTN from the plurality of DTNs according to a policy that minimizes the negative impact that the selection could have on other users of the wireless network.

13. A device, comprising:
a processor; and
a non-transitory computer-readable medium storing computer programming instructions, which, when executed by the processor, cause the device to perform:
determining whether a data session is performance sensitive; and
in response to the data session being performance sensitive:
selecting a data transport node (DTN), and
performing the data session using the selected DTN,
wherein determining whether the data session is performance sensitive includes:
identifying a process associated with the data session;
when a repository of known processes includes an indication of whether the process is likely to generate performance-sensitive data sessions:
determining, using the repository of known processes, whether the process is likely to generate performance-sensitive data sessions, and
in response to determining, using the repository of known processes, that the process is likely to generate performance-sensitive data sessions, determining that the data session is performance sensitive; and
when the repository of known processes does not include an indication of whether the process is likely to generate performance-sensitive data sessions:
monitoring an amount of data communicated by the data session, and
in response to the amount of data communicated by the data session in a predetermined time being greater than a predetermined first threshold, or to a time for the amount of data communicated by the data session to reach a predetermined amount being less than a second threshold, determining that the data session is performance sensitive.

14. The device of claim 13, wherein selecting the DTN includes selecting the DTN according to a performance requirement of the data session.

15. The device of claim 14, wherein selecting the DTN according to a performance requirement of the data session includes:
selecting the DTN according to information regarding a downlink (DL) performance of the DTN when the performance requirement of the data session includes a DL performance requirement; or
selecting the DTN according to information regarding an uplink (UL) performance of the DTN when the performance requirement of the data session includes a UL performance requirement.

16. The device of claim 13, wherein performing the data session using the selected DTN includes:
performing the data session using the selected DTN for a predetermined period of time; and
in response to the predetermined period of time elapsing, selecting a new DTN and performing the data session using the selected new DTN.

17. The device of claim 13, wherein selecting the DTN includes selecting the DTN from a list of available DTNs.

18. The device of claim 17, wherein selecting the DTN from the list of available DTNs includes selecting the DTN according to the respective results of micro speed tests performed on the list of available DTNs.

19. The device of claim 17, wherein selecting the DTN from the list of available DTNs includes selecting the DTN according to respective calculations for the list of available DTNs, wherein the calculations are based on respective metrics, respective properties, or both of the available DTNs.

20. The device of claim 17, wherein selecting the DTN from the list of available DTNs includes selecting the DTN according to historical performance information regarding the list of available DTNs.

21. The device of claim 17, wherein selecting the DTN from the list of available DTNs includes:
selecting the DTN according to a selection criteria; and
when a plurality of DTNs in the list of available DTNs meet the selection criteria, selecting the DTN from the plurality of DTNs according to a policy that minimizes the negative impact that the selection could have on other users of the wireless network.

* * * * *